(12) United States Patent
Eisenhart et al.

(10) Patent No.: US 8,428,358 B2
(45) Date of Patent: Apr. 23, 2013

(54) RADICAL-BASE CLASSIFICATION OF EAST ASIAN HANDWRITING

(75) Inventors: Frank J. Eisenhart, Seattle, WA (US); James A. Pittman, Issaquah, WA (US); Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1257 days.

(21) Appl. No.: 11/139,993

(22) Filed: May 31, 2005

(65) Prior Publication Data
US 2006/0269146 A1 Nov. 30, 2006

(51) Int. Cl.
*G06K 9/18* (2006.01)

(52) U.S. Cl.
USPC .......................................................... 382/185

(58) Field of Classification Search .................. 382/229, 382/185; 707/3
See application file for complete search history.

(56) References Cited

U.S. PATENT DOCUMENTS

| | | | | |
|---|---|---|---|---|
| 5,187,480 A * | 2/1993 | Thomas et al. | ................... | 341/22 |
| 5,475,767 A * | 12/1995 | Du | ................................. | 382/185 |
| 5,586,198 A * | 12/1996 | Lakritz | ........................... | 382/185 |
| 6,041,137 A * | 3/2000 | Van Kleeck | .................. | 382/185 |
| 6,161,116 A * | 12/2000 | Saltzman | ....................... | 715/262 |
| 6,269,189 B1 * | 7/2001 | Chanod | ........................ | 382/229 |
| 6,389,166 B1 * | 5/2002 | Chang et al. | .................. | 382/188 |
| 6,507,678 B2 * | 1/2003 | Yahagi | .......................... | 382/305 |
| 6,539,113 B1 * | 3/2003 | Van Kleeck | .................. | 382/185 |
| 6,556,712 B1 * | 4/2003 | Loudon et al. | ................ | 382/187 |
| 6,681,044 B1 * | 1/2004 | Ma et al. | ....................... | 382/185 |
| 6,956,969 B2 * | 10/2005 | Loudon et al. | ................ | 382/185 |
| 7,058,900 B2 * | 6/2006 | Sugano | ......................... | 715/773 |
| 7,251,365 B2 * | 7/2007 | Fux et al. | ...................... | 382/185 |
| 2001/0002215 A1 * | 5/2001 | Katsuyama | ................... | 382/171 |
| 2001/0028740 A1 * | 10/2001 | Suzuki | .......................... | 382/195 |
| 2003/0086611 A1 * | 5/2003 | Loudon et al. | ................ | 382/186 |
| 2003/0108239 A1 * | 6/2003 | Su et al. | ........................ | 382/177 |
| 2003/0138145 A1 * | 7/2003 | Sugano | ......................... | 382/185 |
| 2003/0154196 A1 * | 8/2003 | Goodwin et al. | ................. | 707/3 |
| 2003/0190074 A1 * | 10/2003 | Loudon et al. | ................ | 382/187 |

\* cited by examiner

*Primary Examiner* — John Strege

(74) *Attorney, Agent, or Firm* — Shook, Hardy & Bacon L.L.P.

(57) ABSTRACT

A system and method for labeling radicals in East Asian characters is described. The identity of the radical and the location of the radical in a character may be stored for future reference.

16 Claims, 9 Drawing Sheets

RADICAL-BASE CLASSIFICATION OF EAST ASIAN HANDWRITING

BACKGROUND OF THE INVENTION

1. Field of the Invention

Aspects of the present invention relate to computing systems. More particularly, aspects of the present invention relate to classifying and organizing radicals of East Asian handwriting.

2. Description of Related Art

Handwriting recognition is one of the goals of computing systems. Computers receive handwritten input and attempt to classify or convert the handwritten input into text. East Asian languages present a unique problem for handwriting recognizers.

One problem with attempting to recognize handwritten input from East Asian languages is the number of characters that are commonly used. As opposed to Western languages (where, for example, 26 or so many letters are used, depending on the language), East Asian languages may include over 10,000 commonly used characters. Attempting to analyze each received handwritten character against 10,000 or more possibilities is 1) time consuming and 2) precludes many recognition strategies, for instance the use of artificial neural networks, because automated learning methods do not scale to 10,000 outputs.

In general, each character in East Asian text may or may or not be made up of one or more radicals or strokes. Recognizing each character is then dependent on properly recognizing each radical correctly.

An improved approach is needed to organize characters into radicals so that handwriting recognition engines may be applied and successfully recognize handwritten input of East Asian characters.

BRIEF SUMMARY OF THE INVENTION

Aspects of the present invention address one or more of the problems described above, thereby providing an improved system for recognizing handwritten East Asian characters. Aspects of the present convention attempt to separate the list of characters into a smaller list of their constituent radicals, which can then be processed more easily by computing systems.

BRIEF DESCRIPTION OF THE DRAWINGS

The present invention is illustrated by way of example and not limited in the accompanying figures.

DETAILED DESCRIPTION OF THE INVENTION

Figure 1:
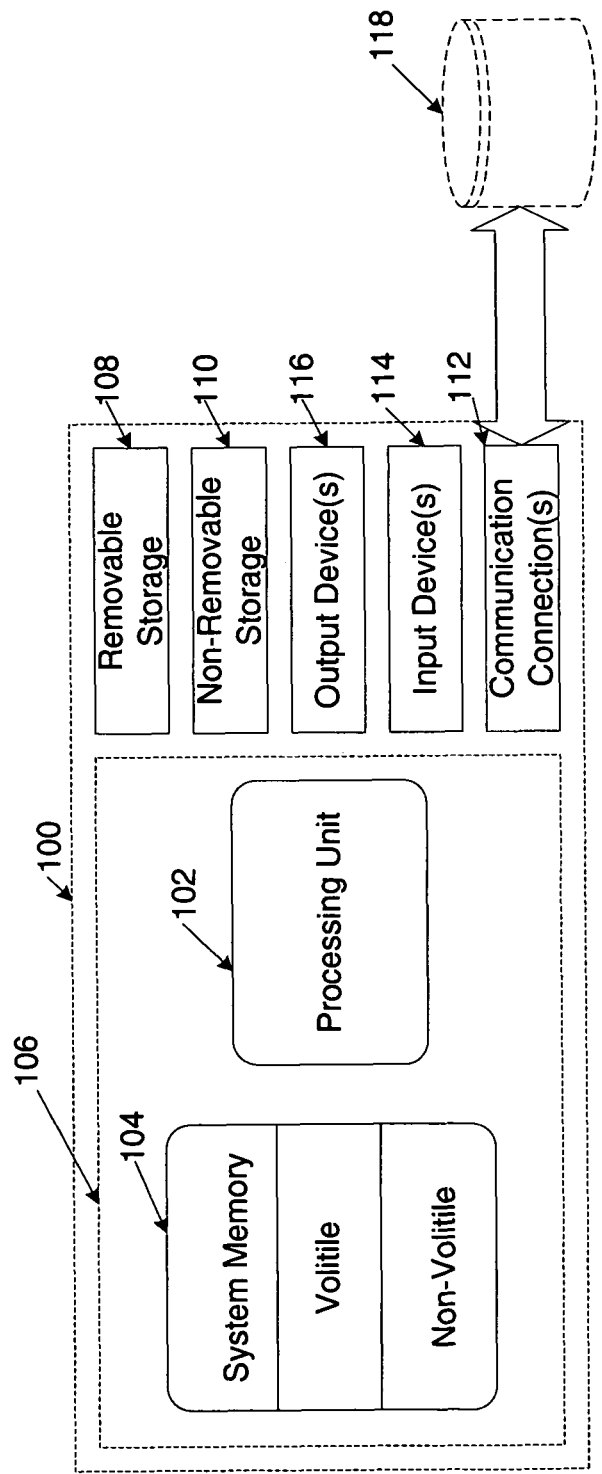
FIG. 1 illustrates a schematic diagram of a general-purpose digital computing environment in which certain aspects of the present invention may be implemented.

Aspects of the present invention relate to organizing radicals from East Asian languages for simplified recognition.

It is noted that various connections are set forth between elements in the following description. It is noted that these connections in general and, unless specified otherwise, may be direct or indirect and that this specification is not intended to be limiting in this respect.

Aspects of the invention relate to labeling of radicals along with noting the physical location of the radical in relation to other radicals that make up a character (spatial positioning). The radicals may be made of strokes. The strokes may be physical ink on paper that is scanned and image later analyzed. Alternatively, the strokes may be electronic ink that is captured by a computer. The electronic ink can then be recognized as one or more radicals and combined into characters. The following describes electronic ink for informative purposes. Aspects of the present invention may or may not be used with electronic ink.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

| Term | Definition |
| --- | --- |
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Radical | A graphical component repeated across two or more characters. |
| Stroke | A sequence or set of captured points relating to electronic ink. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. |
| Computer storage media | "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such, additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well known in the art and are not described at length here. Further, device 100 may be connected to a database 118 that stores information. The database may take a variety forms as known in the art, including but not limited to a SQL database.

It will be appreciated that the network connections shown are illustrative and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
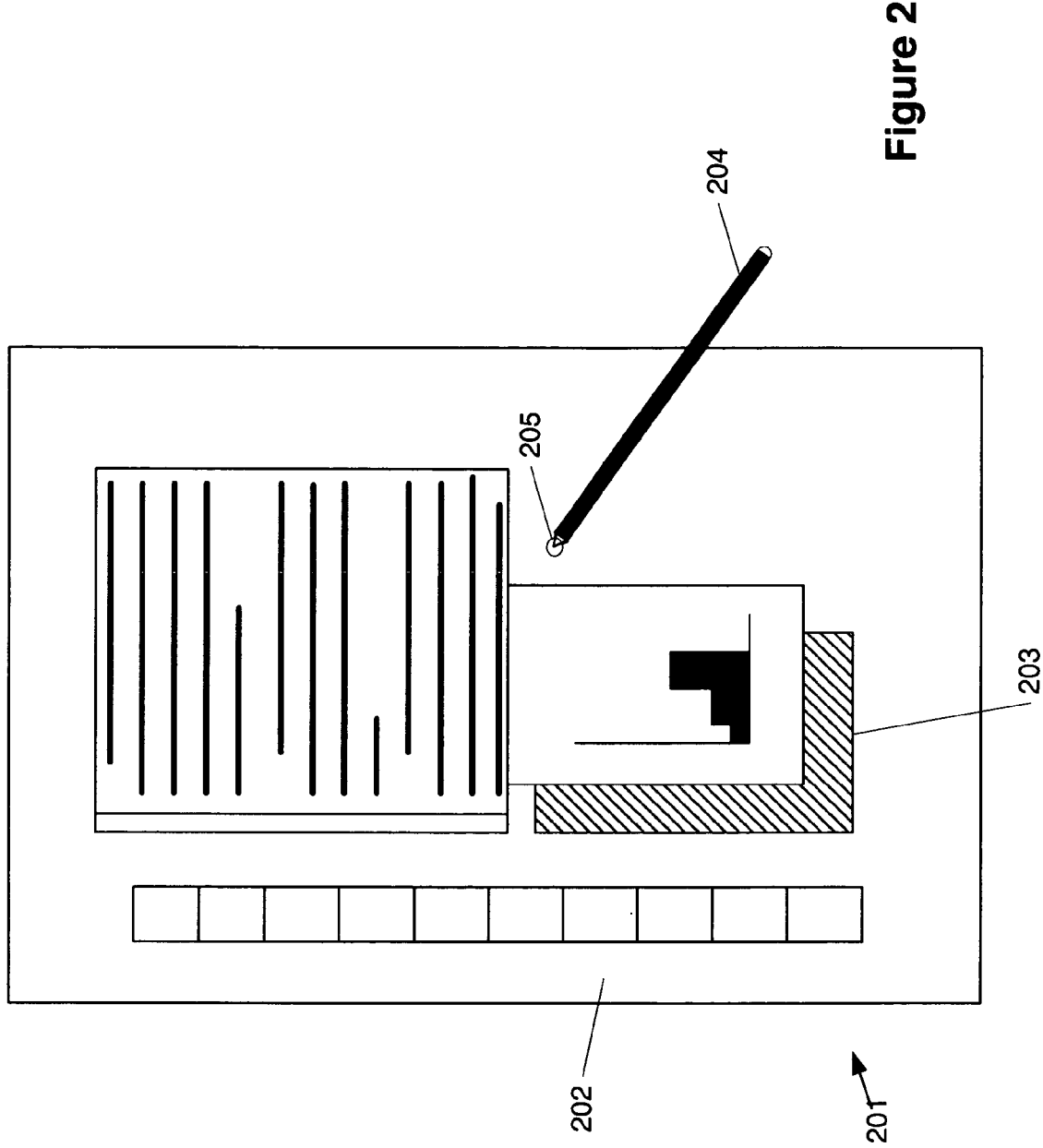
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Radical-Based Classification of East Asian Handwriting

Recognizing East Asian handwritten input is difficult. A standard language may include over 50,000 unique characters with more than 10,000 characters in common use. A resulting recognizer of handwritten input needs to be able to handle the volume of characters.

Figure 3:
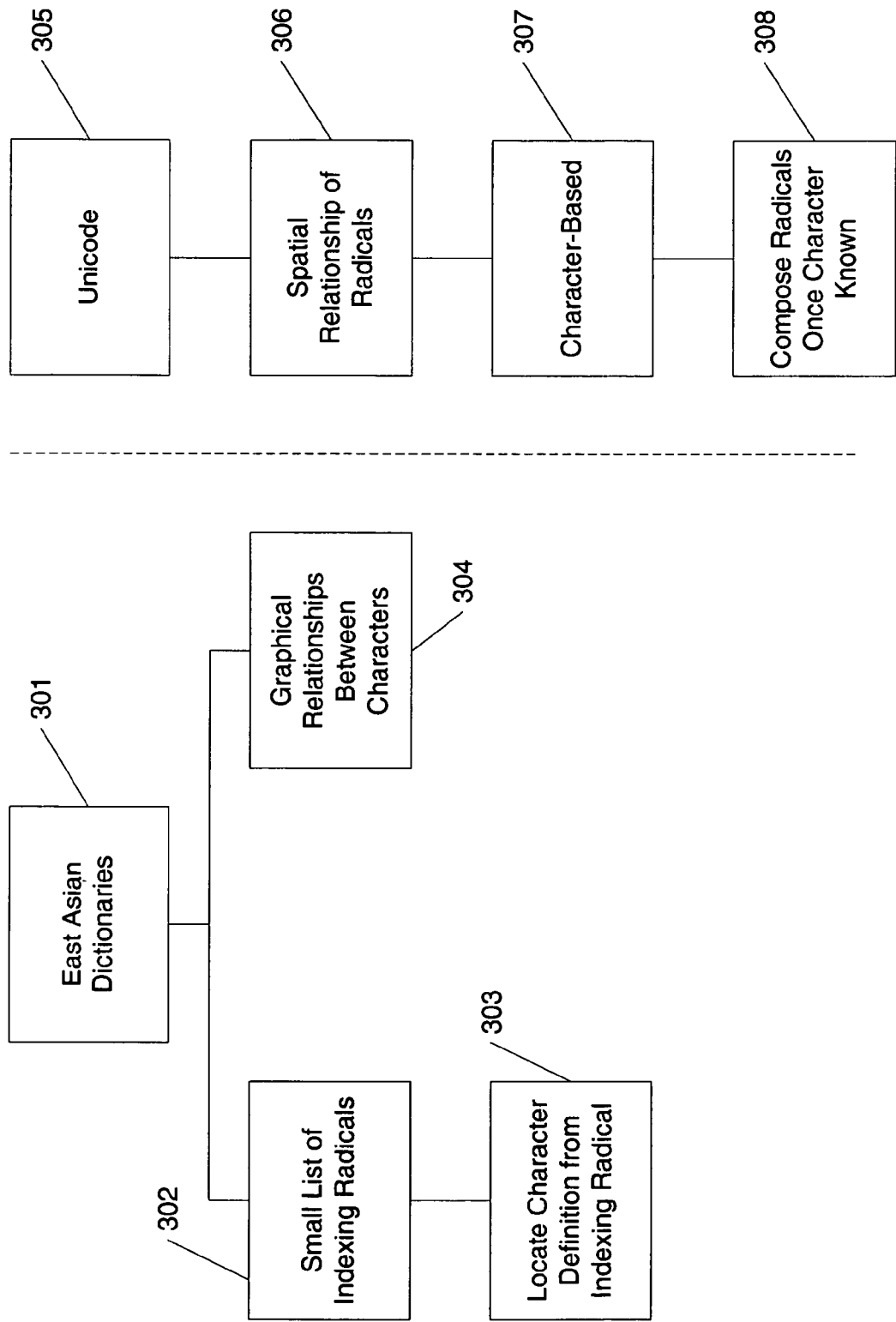
FIG. 3 shows approaches to analyzing characters once a character is known.

People have used dictionaries to determine the meaning of characters. Also, people have attempted to assemble characters from radicals. FIG. 3 shows approaches for accomplishing these tasks.

In a first approach, dictionaries may be used to determine the meaning of characters using radicals. East Asian dictionaries 301 may be separated into various groups: listing a small group of indexing radicals 302 and graphical relationships and derivations of characters 303.

The listing of the small group of radicals 302 are used to locate a character definition from the small list of indexing radicals 303. The following is an example of the small list of radicals. Chinese dictionaries list characters by a set of indexing radicals. Example: 嫌 [suspicion] (the xián character) is listed under radical 38 女 [woman]. Some limitations with this approach include the limited list of radicals (214 in the traditional "KangXi" radical set) compared to the actual number of radicals actually used (about 1000). Some of the 1000 radicals do not correspond to any recognized Character or Unicode code point. It is noted that "radicals" as used herein relate to graphical components repeated across many characters. This includes but is not limited to the linguistic definition of radicals as pertaining to the KangXi indexing radicals. Also, no information about the other radicals (beyond the short list) is included with the small list 302. For example, the right half of xián is the character 兼 [double], but this information is not in a traditional dictionary. Further, the indexing radical does not occupy a consistent position within a character, either in terms of spatial position or stroke order. For example, in 卵 [egg] the indexing radical is #26, 卩, which is the right half of the character and the second of the two radicals drawn. Also, the indexing radical is often different from the true radical used in the character (real-world strinkes). This appears in the egg example—the true radical has an extra stroke in the middle that is missing from the indexing radical.

Figure 4:
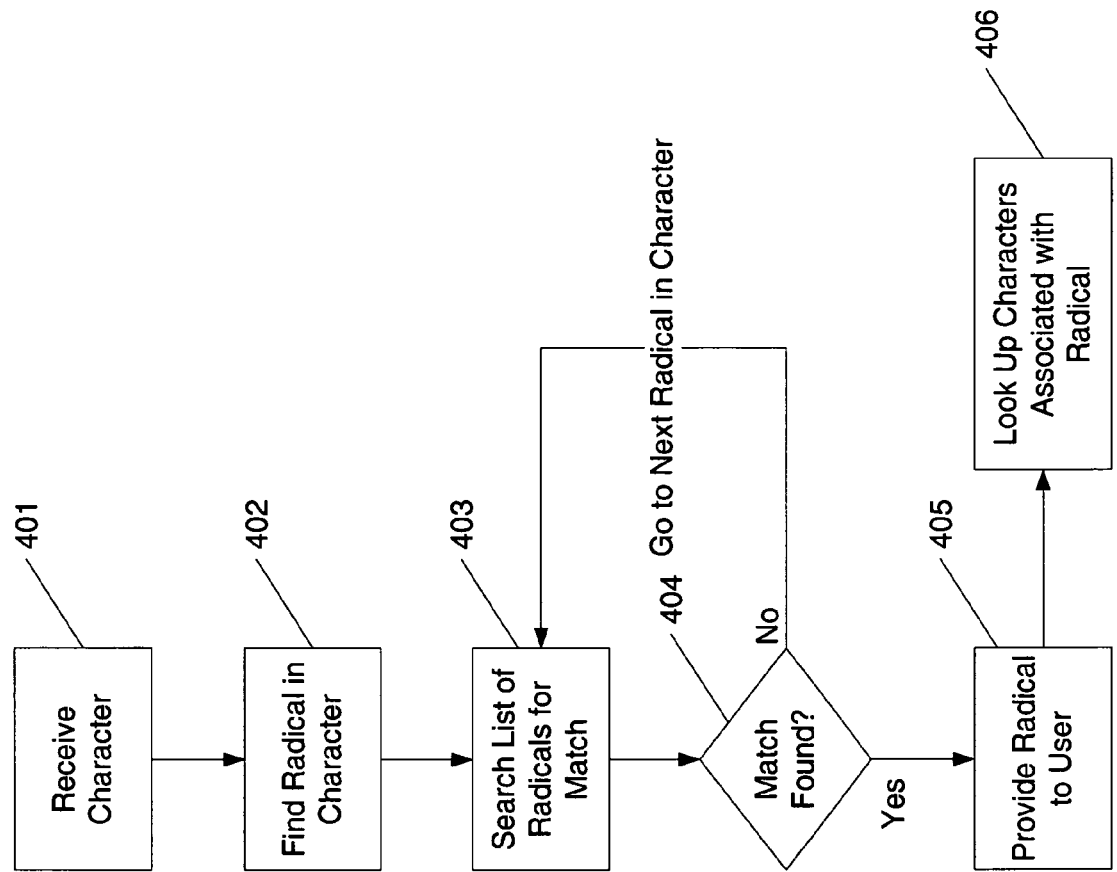
FIG. 4 shows a procedure for using an East Asian dictionary based on selection of a radical.

FIG. 4 shows an approach using a dictionary. In step 401, a character is received. In step 402, one looks for a radical in the character. Next, the user searches a list of radicals for a match in step 403. In step 404, if no match is found, then the user selects another radical in the character. If a match is found, then the user is provided with the radical 405 and may look up characters 406 associated with the radical. This can be a time consuming and tedious process, especially if the East Asian character does not include easily recognized radicals.

Wenlin® is a hypertext dictionary for students learning Chinese that contains a list of the "components" for each character. This includes the indexing radical as described above, but also the other radicals not used in a dictionary index. The Wenlin character database still has limitations that prevent its use in a character recognizer. The limitations include 1) no spatial information about the arrangement of radicals and 2) the listing of radicals is overly inclusive (namely, all possible radicals are listed, even ones that are redundant or even wrong).

First, there is no spatial information about the arrangement of components in the Wenlin system. For example, Wenlin says that 娜 [graceful] contains 女 [woman] and 那 [na, phonetic], but it does not say which component is on the left or right (or even that the character has a left-and-right layout). Second, the components are overly general, often containing multiple interpretations for each character. For example, the components list for 挥 [brandish] contains both the right-hand component 军 [logical consequence] and its sub-component 匕 [dagger]. This ambiguity forces one into a difficult position when one attempts to recognize a character when a character may be interpreted in different ways.

Figure 5:
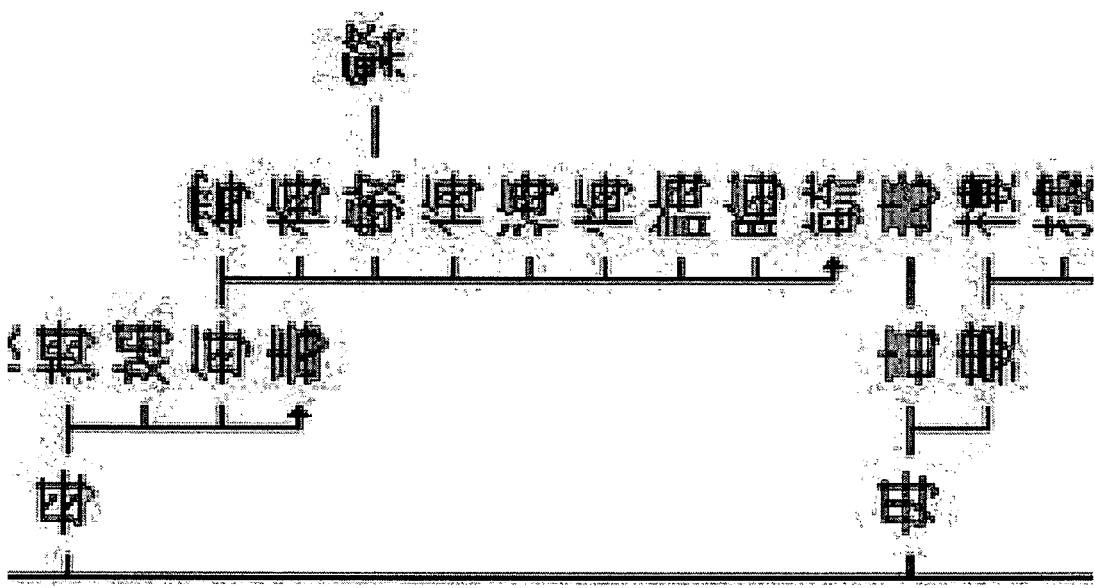
FIG. 5 shows a relationship between East Asian characters.

Another approach attempts to show graphical relationships between characters 304. An example is the website of zhongwen. that includes a hypertext tool that shows a pictorial representation of the etymological relationship between characters (see FIG. 5), but there is no way to translate this picture into a spatial structure or even a list of the radicals/components.

In a second approach, characters may be divided through a labeling system such as Unicode 305. Here, however, Unicode is used to represent a character based on radicals. Arguably, a user already knows the character to be displayed and assembles the radicals of Unicode 305 to form to character. This is in contrast to the dictionaries described above in which one needs to know the radicals to determine the meaning of (and/or recognize) a character.

Figure 6:
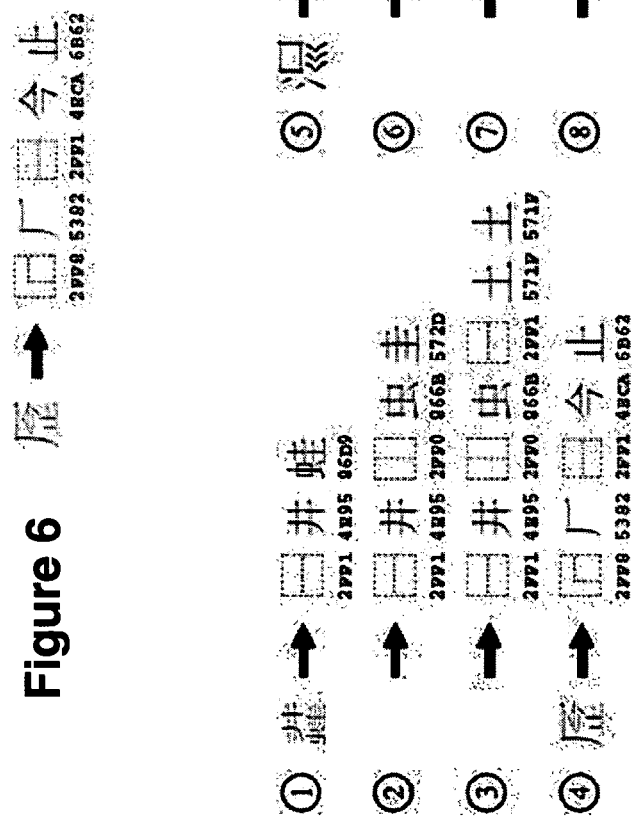
FIGS. 6 and 7 show Unicode parsing of characters into additional characters and radicals.
Figure 7:
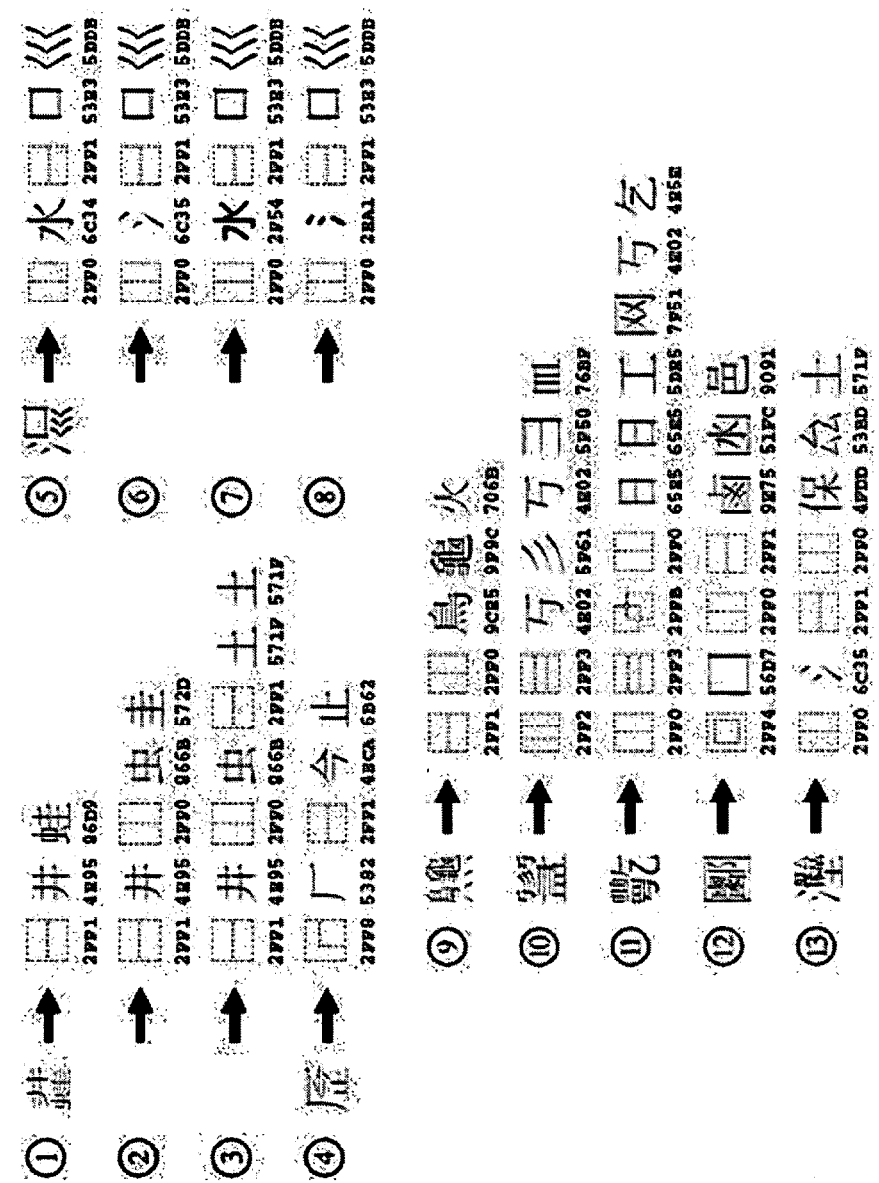

Unicode 305 includes information regarding the spatial relationship of radicals 306 (see also FIGS. 6 and 7). Using Unicode, one may combine radicals into characters. In essence, one needs to know which character one wants to create using Unicode prior to selecting and assembling the radicals and strokes, thereby making Unicode character-based 307. The selection of the radicals is made once a character is known (308). The selection may require both a linguistic background and an understanding of the Unicode scheme.

Unicode includes a set of ideographic description characters (IDCs) that one can use to describe the spatial arrangement of radicals within a Chinese character (see spatial relationship identifiers in FIGS. 6 and 7). Notably, Unicode does not supply a list of radicals for each character. Also, the spatial information in Unicode is used to combine radicals into characters. However, Unicode is not a dictionary, but rather a system for allowing the rendering of characters using radicals and their spatial relationships.

The information regarding Unicode may be found for instance in Chapter 11 of the Unicode Standard 4.0.

Aspect of the present invention may include one or more of the following components:
  Representing radicals in software;
  Using a spatial layout system to associate spatial information with radicals;
  Having a hierarchy of characters;
  Using heuristics to display information from a database of radicals and their spatial relationships with characters; and
  Defining new radicals in the database of radicals.

One or more of the above aspects may be performed in software. Also, the radicals and associated information may be stored in XML or other formats in the database. Further, the spatial layout may include the layouts as described in Unicode 4.0 and the like. For instance, spatial layout information may include left/right information, above/below information, bracketing information (where one radical can be located both to a side and one of above or beneath another radical), and other spatial layouts.

Figure 8:
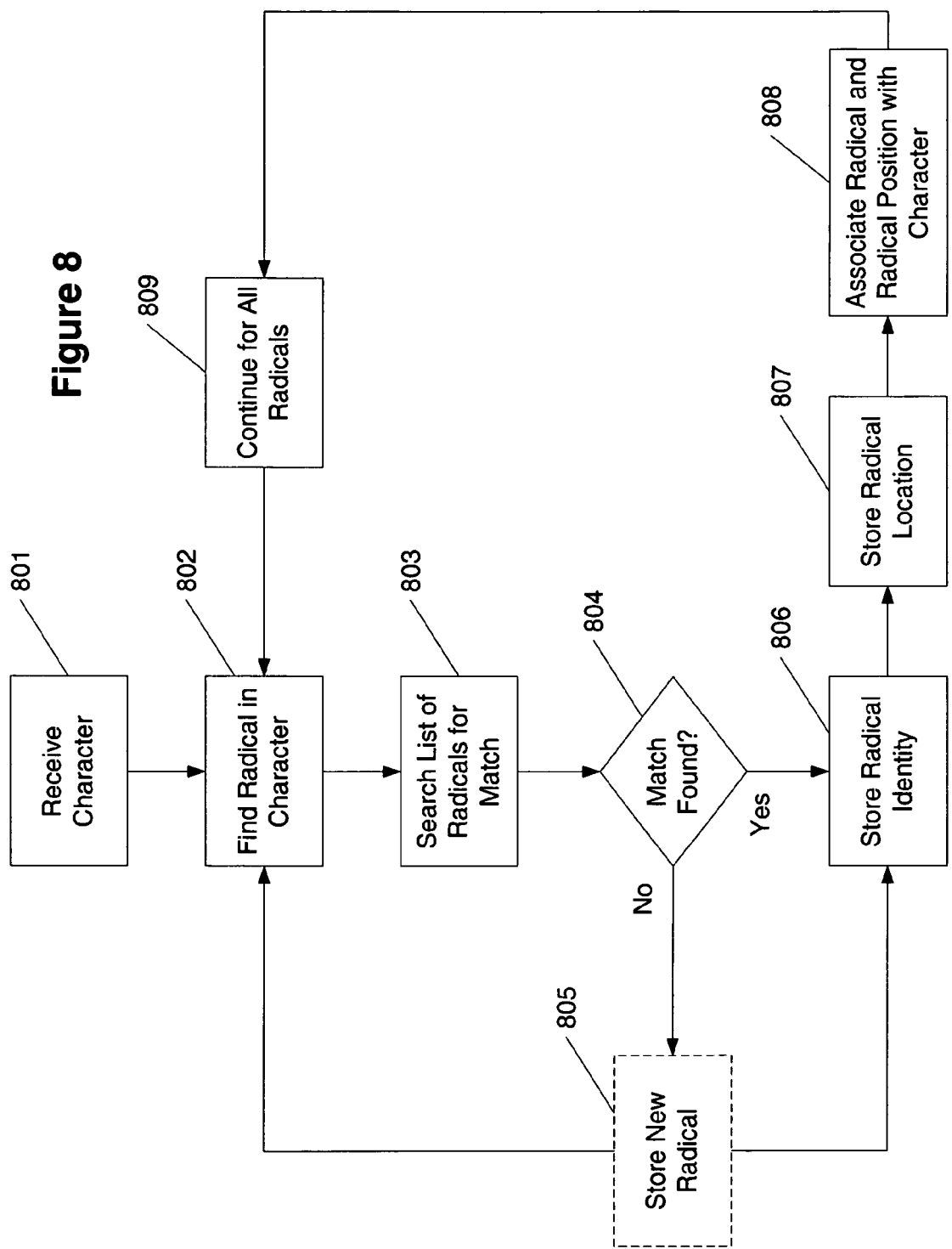
FIG. 8 shows a method of storing a radical and a radical's position information in association with a character in accordance with aspects of the present invention.

FIG. 8 shows a method of storing radicals for a character. In step 801, a character is received. The receiving of a character may be the receipt of an image from a scanner where the scanner has scanned a printed or handwritten East Asian character, an image from an image capturing device including but not limited to a hand-held camera or camera associated with a phone or pen and the like. Also, the receiving of a character may also include receiving electronic ink from a digitizer.

In step 802, the system finds a radical in the received character. The system may find the radical by looking for one or more visual strokes that are used in a radical. For instance, the system may look for closed shapes (including but not limited to circles, multiple-sided boxes, triangles, and the like), singular lines, parallel lines, intersection points, and spaces between lines or other shapes. For instance, the system may separate suspected radicals from each other based on their proximity to other radicals.

Next, in step 803, the system searches a list of radicals for a suspected radical from step 802. If a match is found in step 804, then the identity of the radical is stored in step 806 and the location of the radical stored in step 807. Next, in step 808, the identity of the radical and its position are associated with the character from step 801. If no match is found in step 804 for the suspected radical, the radical may be stored as a new radical in step 805 and then proceed to step 806. Alternatively, the system may skip the storage of new radical in step 805 and returned to find another radical in step 802. After step 808, the process continues for all radicals in step 809 by returning to step 802.

Figure 9:
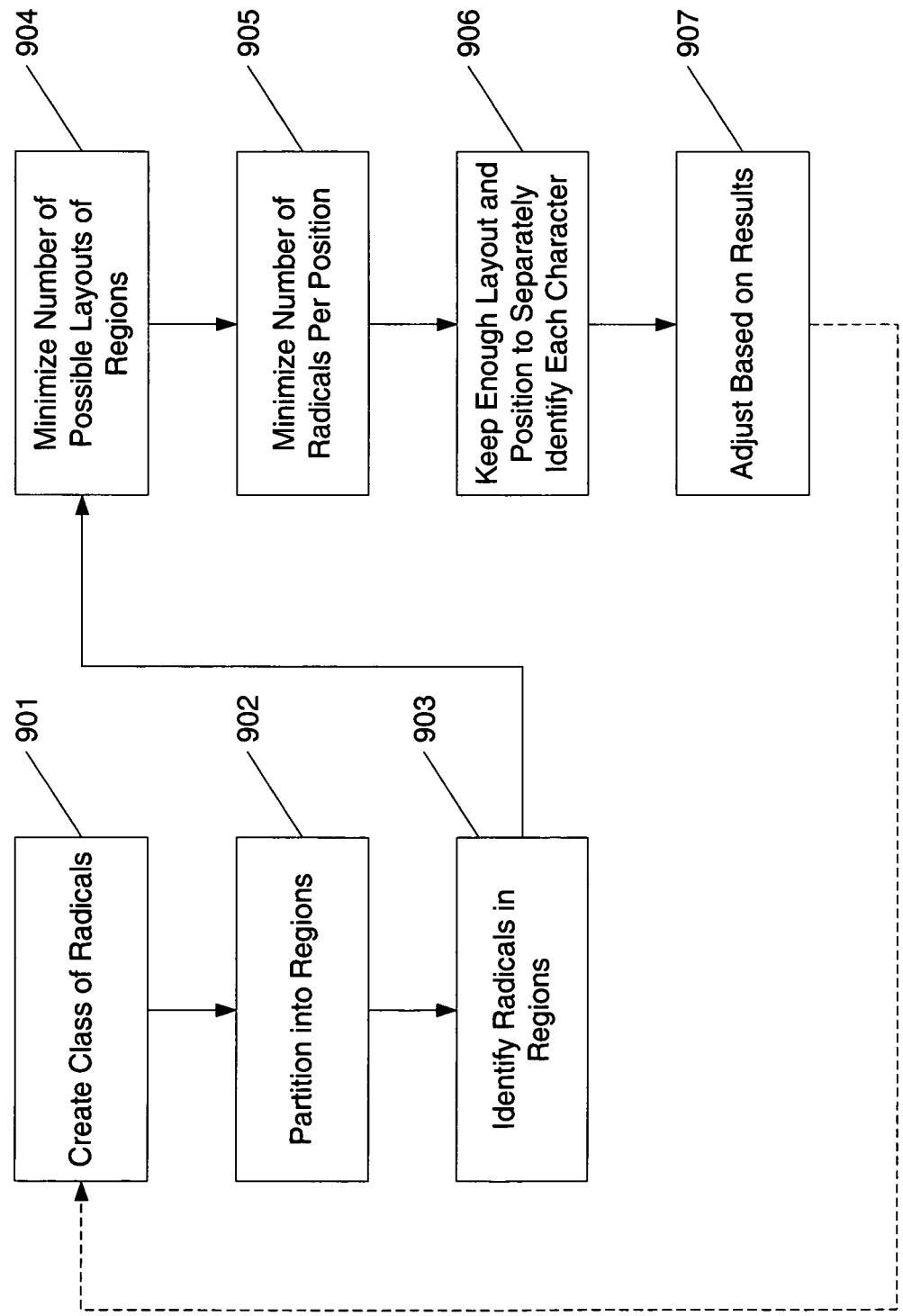
FIG. 9 shows a method of labeling radicals in accordance with aspects of the present invention.

FIG. 9 shows an approach for labeling radicals in accordance with aspects of the present invention. In step 901, a class of radicals is created. In step 902, each class is partitioned into regions. In step 903, radicals are identified in each of the regions. Next in step 904, the process attempts to minimize the number of possible layouts of regions. In step 905, the process attempts to minimize the number of radicals per position. In step 906, the process attempts to keep enough layout and position information to ensure that each character is separately identified. In step 907, the process adjusts the labeling process based on results. For instance, the labeling system may attempt to check its results against previously labeled characters.

In the steps mentioned above, each may be performed manually or by one or more processors. With respect to a hardware/software solution being added to one or more steps of FIG. 9, a recognizer may optionally be added to help make decisions about optimizing the radical partition/grouping. For instance in FIG. 9, the steps 904, 905, 906, and 907 can be optimized to maximize the recognition rate of a recognizer module.

Here, the process attempts to minimize the radicals for each position. For instance, the process attempts to prevent two different characters having the exact same list of radicals and their respective spatial arrangements in the characters.

The process as shown in FIG. 9 may be performed once per class or may be iteratively performed as shown by the broken line connecting step 906 back to step 901.

Figure 10:
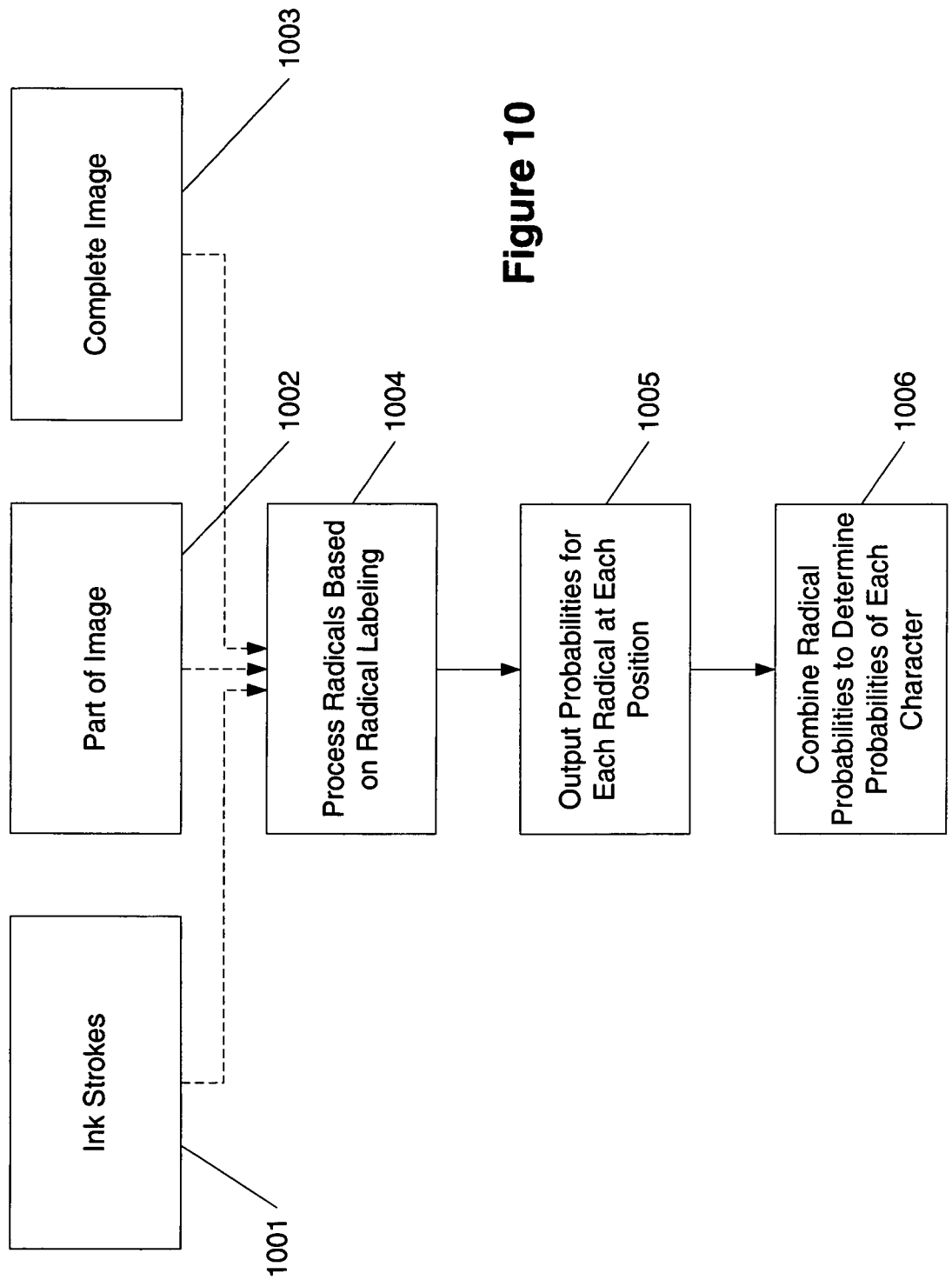
FIG. 10 shows an image-based classifier in accordance with aspects of the present invention.

FIG. 10 shows a process related to an image-based classifier using the information stored in a database regarding radical identities and position information to determine a character based on discovered radicals. Here, electronic ink strokes 1001, a part or parts of an image 1002, and/or a complete image 1003 may be analyzed. A complete image may include one or more East Asian characters to be analyzed. One advantage of having two or more characters is that one can use context information from other characters to help the recognition of a first character.

In step 1004, the system processes radicals based on radical labeling. The radicals may or may not be segmented in step 1004. Next, in step 1005, output probabilities for each radical at each position are output. In step 1006, the process combines radical probabilities to determine probabilities of each character.

The probability determinations described in FIG. 10 may be determined by a neural network. At least two different types of neural networks may be used including but not limited to a time delay neural network and an image based neural network. The time delay neural network can be similar to that used in speech recognition systems.

Further, neural networks may be used to help label radicals as shown in FIG. 8. For instance, a character to be labeled may be received and processed by one of a person, a processor, or both. Here, the entity performing the labeling may base the determination of whether a subject radical is a new radical to be labeled based on experience or based on searching a stored list of radicals (for instance, in a table or database). The entity may then match the radical or add a new radical to the table or database (or person's memory) in due course. Here, as an alternative embodiment, a person acting as a character labeler may use one or more processors (possibly forming a neural network) to assist in the labeling processes. For instance, the processor or processors may provide the person with a list of radicals that may match a selected radical. The person may then select one of the provided radicals, ask for more options, or have the selected radical stored for future reference. Similarly, the processor or processors may perform an image analysis operation to determine where in a received character the selected radical is located. This information may also be provided to the person controlling the labeling function, where confirmation of the location is made.

The processor or processors may be merely providing information to the person. Alternatively, the processor or processors may use the information gained from the person's selections and guidance to refine the processor or processors' selections. Here, the processor or processors may form a neural network that learns character label as a person interacts with it.

The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. A radical labeling system comprising:
    an input that receives an East Asian character;
    a processor that identifies a suspected radical in said East Asian character and searches a list of radicals for said suspected radical and determines whether the suspected radical is present in the list of radicals, wherein said suspected radical is a subset of strokes within said East Asian character; and
    a storage database that, upon the determination that the suspected radical is present in the list of radicals, stores, with said character, an association between an identity of said suspected radical and a position in said character of said suspected radical in relation to other radicals, wherein said position in said character of said suspected radical is based on a spatial layout of Unicode that uses a Unicode value to identify the position of the suspected radical in relation to other radicals within the character, and wherein said spatial layout includes left-and-right layout information, above-and-below layout information and bracketing information.

2. The system according to claim 1, wherein said processor is controlled by a person performing a labeling function.

3. The system according to claim 1, wherein upon determining that said suspected radical is not present in the list of radicals, said processor further identifies said suspected radical as a new radical, and wherein the storage database further stores, with said character, an association between an identity of said new radical and a position in said character of said new radical.

4. The system according to claim 1, wherein, upon determining that the suspected radical is not present in the list of radicals, said processor attempts to find another radical in said character.

5. The system according to claim 1, wherein said processor continues to process said character until all radicals in said character are identified.

6. Computer-storage media having computer-useable instructions embodied thereon for performing a method of labeling radicals in East Asian characters, the method comprising the steps of:
    receiving a character;
    finding a plurality of strokes in said character that form a suspected radical based on a search within said character for at least closed shapes, singular lines, parallel lines, intersection points and spaces between lines and shapes;
    searching a list of radicals for said suspected radical;
    based on a spatial layout of Unicode, identifying a position of said suspected radical in relation to other radicals in said character, wherein said spatial layout includes left-and-right layout information, above-and-below layout information and bracketing information, and wherein the spatial layout of Unicode identifies whether the suspected radical is positioned within the character to the left, to the right, above, below, or is bracketed, in relation to other radicals within the character;
    providing an association between said position of said suspected radical in relation to other radicals in said character and an identity of said character; and
    storing, with said character, the association between said position of said suspected radical in said character and said identity of said character.

7. The media according to claim 6, wherein the method further comprises the step of:
    storing said suspected radical as a new radical if said suspected radical is not found in said list of radicals.

8. The media according to claim 6, wherein the method further comprises the step of:
    finding another radical in said character if said suspected radical is not in said list of radicals.

9. The media according to claim 6, wherein the method further comprises the step of:
    continuing to process said character until all radicals in said character are found.

10. Computer-storage media having computer-useable instructions embodied thereon for performing a method of labeling radicals of East Asian characters, the method comprising:
    creating a class of radicals;
    partitioning said class of radicals into regions, wherein the regions are parts of a character layout in which the radicals appear;
    identifying radicals in said regions;
    minimizing a number of possible layouts of regions; and
    minimizing a number of radicals per region.

11. The media according to claim 10, wherein the method further comprises the step of:
   maintaining enough layout and position information to separately identify each character based on radicals.

12. The media according to claim 10, wherein the method further comprises the step of:
   adjusting said labeling based on results from said identification step.

13. The media according to claim 10, wherein the method further comprises the step of:
   using the minimized number of possible layout regions to modify recognizer performance of a handwriting recognizer.

14. The media according to claim 10, wherein the method further comprises the step of:
   using the minimized number of radicals per region to modify recognizer performance of a handwriting recognizer.

15. The media according to claim 11, wherein the method further comprises the step of:
   using the layout and position information to modify recognizer performance of a handwriting recognizer.

16. The media according to claim 12, wherein the method further comprises the step of:
   using the adjusted labeling information to modify recognizer performance of a handwriting recognizer.

* * * * *